B. B. GRUNWALD.
APPARATUS FOR MANUFACTURING MAGNESIUM CARBONATE.
APPLICATION FILED MAR. 18, 1918.
1,361,325.
Patented Dec. 7, 1920.
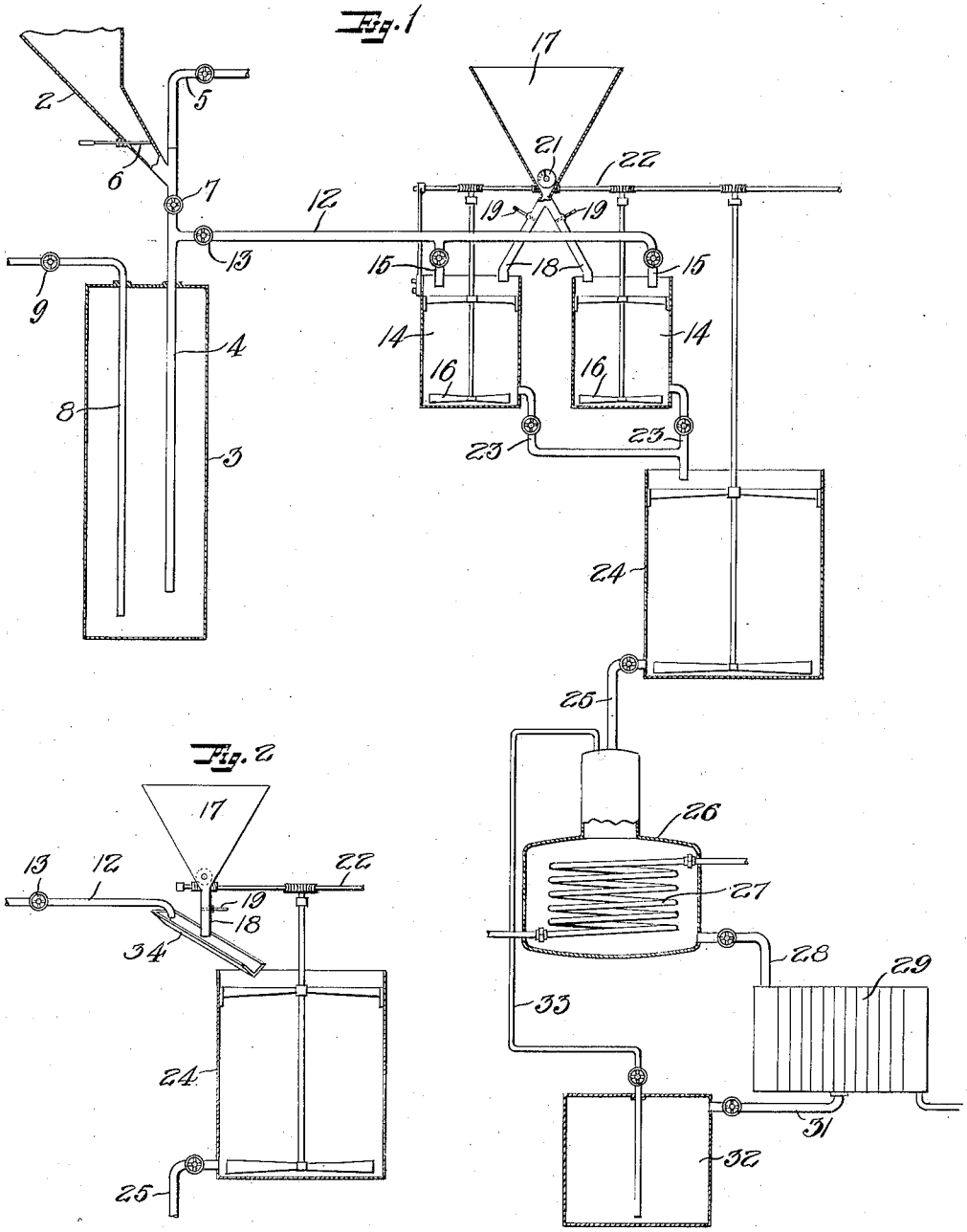
WITNESS
J. B. Gardner
INVENTOR.
B. B. GRUNWALD
BY White & Prest
ATTORNEYS

UNITED STATES PATENT OFFICE.

BERTRAND B. GRUNWALD, OF ALAMEDA, CALIFORNIA, ASSIGNOR TO NATIONAL MAGNESIA MANUFACTURING COMPANY, A CORPORATION OF CALIFORNIA.

APPARATUS FOR MANUFACTURING MAGNESIUM CARBONATE.

1,361,325.  Specification of Letters Patent.  Patented Dec. 7, 1920.

Application filed March 18, 1918. Serial No. 223,145.

*To all whom it may concern:*

Be it known that I, BERTRAND B. GRUNWALD, a subject of the Emperor of Austria, and a resident of Alameda, county of Alameda, and State of California, have invented certain new and useful Apparatus for Manufacturing Magnesium Carbonate, of which the following is a specification.

The invention relates to an apparatus for manufacturing magnesium carbonate.

An object of the invention is to provide an apparatus for manufacturing magnesium carbonate from magnesite.

A further object of the invention is to provide an apparatus with which the output of a given plant may be increased.

The invention possesses other advantageous features, some of which, with the foregoing, will be set forth at length in the following description where I shall outline in full, that form of the apparatus which I have selected for illustration in the drawings accompanying and forming part of the present specification. In said drawings I have shown one specific form of the apparatus of my invention, but it is to be understood that I do not limit myself to such form, since the invention, as expressed in the claims, may be embodied in a plurality of forms.

Referring to said drawings:

Figure 1 is an elevation, partly diagrammatic, of the apparatus of my invention.

Fig. 2 is an elevation, partly diagrammatic, of a modification of a portion of the apparatus.

In the manufacture of magnesium carbonate from magnesite, the magnesite is calcined in a suitable kiln and then ground. The ground calcined magnesite is then charged into a suitable hopper 2 whence it is discharged into the closed tank 3. The hopper is preferably connected with the pipe 4 depending into the tank and which is connected at its upper end with the water supply pipe 5, a sliding valve 6 being employed to control the discharge of magnesite from the hopper. The tank is preferably simultaneously charged with calcined magnesite and water and when the proper charge has been entered, the valve 7 in the pipe 4 is closed. The treatment of the calcined magnesite with water converts the magnesite into hydrated magnesia. Depending into the tank 3 to a point adjacent the bottom is a pipe 8 connected to a source of carbon dioxid under pressure, the flow of which through the pipe is controlled by the valve 9. This valve is then opened and carbon dioxid under pressure is introduced into the bottom of tank whence it is disseminated throughout the entire liquid mass therein. The carbon dioxid converts the hydrated magnesia into a milky mixture of magnesium bicarbonate in solution and normal magnesium carbonate in suspension and also creates pressure within the tank.

Connected to the pipe 4, is a conduit 12 provided with a valve 13, through which the milky liquid mass in the tank flows when the valve 13 is opened. From the conduit 12, the milky mixture discharges into one or more mixing tanks 14, through the valved spouts 15. The mixing tanks are used alternately, one being filled while the other is being emptied. Arranged in each tank is a stirrer 16 which is driven by suitable means. Disposed above the mixing tanks is a hopper 17 adapted to contain ground calcined magnesite and which is provided with spouts 18 leading to the respective mixing tanks 14. Each spout 18 is provided with a sliding valve 19 whereby the flow of calcined magnesite into the mixing tanks may be stopped and started when desired. In order to provide a continuous flow of ground magnesite into the mixing tank when the slide valve is open, I provide a screw conveyer 21 in the bottom of the hopper 17 which feeds the ground magnesite to the spout. The screw conveyer is driven at such speed that the proper amount of ground calcined magnesite is fed into the mixing tank while the liquid is flowing thereinto, so that when the tank has been filled, the proper amount of magnesite has been added. The conveyer is preferably driven by the shaft 22 which is also connected to the shafts of the stirrers 16.

The mixing tanks are provided with discharge conduits 23 through which the mixture flows into the agitator 24, wherein it is agitated for a sufficient length of time to insure the conversion of the added calcined magnesite to magnesium carbonate. From the agitator the mixture flows through the conduit 25 into the bottle or container 26. Arranged in the bottle is a steam coil 27 by means of which the mixture is heated to precipitate the carbonate and drive off carbon dioxid. From the bottle, the precipitated carbonate flows through the conduit 28 into the filter 29 wherein the excess water is drained off and the carbonate reduced to a thick, mushy consistency. From the filter, the thick mass is flowed through the conduit 31 into the closed tank 32. Connecting the bottle 26 with the tank 32 is a conduit 33 through which the gas driven off in the bottle is conveyed into the tank 32, wherein it is mixed with the mushy carbonate therein, converting a portion of it into a bicarbonate. After sufficient treatment with carbonic acid gas, the material is flowed from the tank 32 into molds, for drying.

Instead of employing mixing tanks, the conduit 12 may be arranged to discharge into a launder 34, which discharges into the agitator. The ground calcined magnesite is fed to the launder at the proper rate and is washed by the flowing liquid, into the agitator.

I claim:

1. In apparatus for the manufacture of magnesium carbonate from calcined magnesite, a hydrating chamber with means for supplying carbon dioxid, a heated precipitating means, and agitating means receiving the substance from the said chamber and delivering it to the precipitating means.

2. In apparatus for the manufacture of magnesium carbonate from calcined magnesite, a hydrating chamber with means for supplying carbon dioxid, a heated precipitating means, agitating means receiving the substance from the said chamber and delivering it to the precipitating means, and means for introducing additional magnesite to the substance in its passage between the hydrating chamber and the precipitating means.

3. In apparatus for the manufacture of magnesium carbonate from calcined magnesite, a closed hydrating chamber with means for supplying carbon dioxid, selective mixing tanks, receiving the discharge from the said chamber, and means for supplying magnesite to either tank, and an agitating tank into which the mixing tanks discharge.

4. In apparatus for the manufacture of magnesium carbonate from calcined magnesite, a closed hydrating chamber with means for supplying carbon dioxid, selective mixing tanks receiving the discharge from the said chamber, means for supplying magnesite to either tank, an agitating tank into which the mixing tanks discharge, and a heated precipitating means receiving the substance from said tank.

5. In apparatus for the manufacture of magnesium carbonate from calcined magnesite, a hydrating and carbonating chamber, an agitating tank, and intermediate means by which additional magnesite is introduced into the substance from the chamber, and a receptacle in which the product from the agitating tank is heated.

6. In apparatus for the manufacture of magnesium carbonate from calcined magnesite, a hydrating and carbonating chamber having a common pipe for supplying calcined magnesite and water, mixing means, a discharge pipe connected to said common pipe, valves for controlling the discharge from said chamber, and means for introducing additional magnesite into the discharge from the chamber.

7. In apparatus for the manufacture of magnesium carbonate from calcined magnesite, a hydrating and carbonating chamber, a plurality of mixing tanks, a discharge pipe connecting said chamber and either of said tanks, means for introducing additional magnesite into either tank, and an agitating tank receiving the mixture from either tank.

8. In apparatus for the manufacture of magnesium carbonate from calcined magnesite, a hydrating and carbonating chamber, means for mixing with the discharge from the said chamber additional magnesite, a closed receptacle for the mixture, means for heating the mixture in the receptacle, a filter connected to said receptacle to receive the product and separate off a portion of the water, and a carbonate receiver connected to the filter and to the receptacle to take from the latter carbon dioxid.

9. In apparatus for the manufacture of magnesium carbonate from calcined magnesite, means for converting the magnesite into normal magnesium carbonate, comprising a closed chamber, means to charge the chamber with calcined magnesite and water, means to supply carbon dioxid to the chamber, a mixing tank, a pipe leading from the chamber to the mixing tank, means to introduce additional calcined magnesite to the mixture in the said tank, a closed receptacle into which the normal magnesium carbonate from the tank is introduced, means for heating the material in said receptacle, a filter for removing excess water from the basic carbonate, and means for subjecting the basic carbonate to the action of carbon dioxid.

In testimony whereof, I have hereunto set my hand at San Francisco, California, this 27th day of February 1918.

BERTRAND B. GRUNWALD.

In presence of—
H. G. PROST.